(12) United States Patent
Morris

(10) Patent No.: US 6,691,733 B1
(45) Date of Patent: *Feb. 17, 2004

(54) TAPPING CONNECTOR AND METHOD OF USING SAME

(76) Inventor: Bruce E. Morris, 8803 Bird Forest, Houston, TX (US) 77001

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,812

(22) Filed: Nov. 4, 1997

(51) Int. Cl.[7] .................... F16K 43/00; F16L 55/11; F16L 55/115
(52) U.S. Cl. .................... 137/317; 137/318; 138/89
(58) Field of Search .................... 137/15, 68.19, 137/68.25, 68.29, 68.3, 315, 317, 318; 138/89, 94, 97; 220/265, 267; 285/3, 197

(56) References Cited

U.S. PATENT DOCUMENTS

| 438,740 | A | * | 10/1890 | Eley | 137/15 |
| 460,773 | A | * | 10/1891 | Eley | 137/318 |
| 2,553,267 | A | * | 5/1951 | Nedoh | 137/68.25 |
| 2,756,486 | A | * | 7/1956 | Smith | 137/318 |
| 3,471,176 | A | | 10/1969 | Gilchrist | 285/111 |
| 3,872,874 | A | * | 3/1975 | Nedelec | 137/68.25 |
| 3,891,146 | A | | 6/1975 | Blazek | 138/94.3 |
| 4,072,160 | A | * | 2/1978 | Hansen | 137/68.3 |
| 4,128,107 | A | * | 12/1978 | Blumhardt | 137/318 |
| 4,579,484 | A | | 4/1986 | Sullivan | 408/56 |
| 4,580,589 | A | * | 4/1986 | Le Bras et al. | 137/68.25 |
| 4,609,209 | A | | 9/1986 | Ralls | 285/24 |
| 4,708,373 | A | | 11/1987 | Morriss, Jr. | 285/156 |
| 4,719,936 | A | * | 1/1988 | Tsubakimoto et al. | 137/318 |
| 4,751,938 | A | * | 6/1988 | Kerns et al. | 137/68.25 |
| 4,830,052 | A | * | 5/1989 | Oberlin et al. | 137/68.25 |
| 5,040,828 | A | | 8/1991 | Kane | 285/197 |
| 5,076,312 | A | * | 12/1991 | Powell | 137/68.25 |
| 5,161,828 | A | | 11/1992 | Hynes et al. | 285/2 |
| 5,582,211 | A | | 12/1996 | Monson | 138/94.3 |

FOREIGN PATENT DOCUMENTS

| DE | 2708505 | * | 8/1978 | | 137/68.25 |
| FR | 77512 | * | 2/1962 | | 137/318 |

OTHER PUBLICATIONS

Illustration.

* cited by examiner

Primary Examiner—George L. Walton
(74) Attorney, Agent, or Firm—Howrey Simon Arnold & White

(57) ABSTRACT

A tapping connector for a pipeline, vessel or the like wherein the connector has a membrane disposed therein. The membrane may be curved or arcuate and may be configured to offer a partially cylindrical profile that resembles the wall of a pipe. The tapping connector may be used to provide future connection points for branch lines to the pipeline, vessel or other containment structure. The membrane so configured may be removed by conventional pipe tapping equipment.

21 Claims, 12 Drawing Sheets

TAPPING CONNECTOR AND METHOD OF USING SAME

BACKGROUND OF THE INVENTION

1. Field of the Invention

The present invention relates generally to pipeline and vessel connections and more specifically to devices for subsequent connection of, for example, a tie-in line or branch pipe to a carrier pipe. The invention more particularly concerns a tapping flange for connecting branch pipes to carrier pipes, such as subsea carrier pipes used for carrying oil and/or gas.

2. Description of Related Art

When subsea transmission pipelines are laid, side tap assemblies are typically installed at regular intervals for future tie-ins of branch, in-field, or lateral pipelines. For example, in a typical 50-mile long pipeline section, an average of five to six side tap assemblies may be required. However, the relatively high cost of these assemblies and the special handling they require during installation can be problematic and may discourage their use and result in a reduction in number or total elimination of side taps. In those cases where side tap assemblies are not initially installed, later tie-ins may require the installation of costly, subsea-installed, hot tap connectors.

In an effort to reduce the cost of configuring a pipeline for future tie-ins, a blocking flange and removable blocking plug assembly has sometimes been employed. Such a flange and plug assembly may be installed on a tee-type fitting and welded into the pipeline during the pipe laying operation. Using this type of fitting, at the time a tie-in is required, the operator may install a valve on the flange and, using special equipment, reach through the valve to remove the plug. Subsequent to this operation, a special basket may be deployed and locked into the flange to accommodate pigging bars to prevent inadvertent misdirection of a pig.

The disadvantages of the flange and blocking plug assembly approach are numerous. For example, the plug and operating screws of a typical blocking plug mechanism are elastomer sealed. This may result in a significant leak path if the elastomer degrades or is exposed to incompatible fluids. Further, such blocking plugs were originally designed to be temporary blocking devices for pipeline plugging and bypass operations, and therefore were not specifically designed for removal. Consequently, the success of a subsea blocking plug removal operation cannot be assured. Finally, deployment of a blocking plug removal tool and pigging basket installation tool requires additional diving time at considerable expense to the pipeline owner/operator.

To overcome the above described potential for blocking plug leaks, it has been proposed that a blocking flange be welded to a pipe section that is in turn welded to a transmission pipeline wall. The transmission pipeline wall would then be cut out at such time as a lateral connection is required. The problems associated with this approach, however, are also numerous. For example, the weldment of the pipe stub to the main pipeline would have to be a fillet profile, and fillet welds are not generally accepted for pressure containing weldments since they can not be easily inspected. Also, studies have indicated that a branch outlet size should not exceed 50% of the diameter of the main pipeline, and this limitation would be too restrictive in some applications where anticipated branch pipe flow rates would require large piping sizes. Additionally, the stress behavior of the post-tapped joint could not be simulated with traditional hydrostatic pressure testing, and even with this approach, a blocking or similar type flange would be required for installation of a pigging basket to prevent misdirection of pigs and subsequent blockage of the main pipeline. Finally, as noted above regarding removal of a blocking plug, tapping of the main pipeline wall and installation of the basket can be expected to be very costly operations.

SUMMARY OF THE INVENTION

In one respect, the present invention comprises a tapping connector for sealing, isolating, and/or tapping containment structures such as pipes, including underwater or surface pipelines. In one embodiment utilized with pipes, the connector is typically installed during pipeline construction to allow future connections to the pipeline.

In another respect, the invention comprises a flange or other bored connector which includes an arcuate membrane or diaphragm, typically an elongated arched membrane whose longitudinal axis or centerline may be generally transverse relative to the axis or centerline of the bore. The membrane or diaphragm typically has a transverse cross-section which is arch-shaped. The ends and sides of the arched membrane or diaphragm typically extend to the walls of the bore and seal the bore. The opposing inner and outer surfaces of the arch may have the same or different curvatures. The curvature of the arch and the thickness of the membrane are typically configured such that the cutter of a boring tool experiences alternate cutting and clearing periods when boring through the membrane. The longitudinal centerline of the arched membrane or diaphragm typically lies generally transverse to the longitudinal centerline of its connector. The outer and inner surfaces of an arcuate membrane each typically define an arc of a circle, but may also individually or together define other curves or mixtures of curves including, but not limited to, parabolic. Thus, a membrane seal of the invention may be configured to resemble a longitudinal segment of a conduit whose ends and side-edges intersect the inner wall surfaces of a conduit to seal off the bore of the connector. The composition of the membrane is such as to be drillable but also strong enough to serve as a seal.

In another respect, the tapping connector, of which the membrane or diaphragm is a part, is typically adapted at each end to be connected to a conduit or a vessel for conveying or otherwise containing fluids. Especially effective applications of the invention lie in tapping a pipeline, storage tank or the like. Advantageously, the connector may form part of an original pipeline, tank, reaction vessel or the like, or it may be added at a later time.

In one embodiment of the tapping connector, a membrane may be defined by opposing surfaces comprising an outer convex surface and an inner concave surface, wherein these outer and inner surfaces are each characterized by a radius of curvature. The membrane may further be defined by a generally linear longitudinal axis or centerline and a generally curved or arched latitudinal axis or centerline. These centerlines are typically approximately perpendicular to one another. The outer and inner membrane surfaces may have similar radii of curvature and therefore be coaxial with one another, in which case the membrane presents an essentially constant cross sectional profile. In another embodiment, the outer, convex surface may be defined by a larger radius of curvature than that of the inner concave surface. In yet another embodiment, the outer, convex surface may be defined by a smaller radius of curvature than that of the inner, concave surface.

In another embodiment, the tapping connector of the present invention may be manufactured such that it is integral with other connectors or connecting devices. For example, the tapping connector of this invention may be integral with a tee connection or a Y-shaped connection. The tapping connector may also be integral with a collet connector apparatus or a boltless flange connector apparatus.

In another broad respect, this invention comprises a method for connecting a first containment structure to a second containment structure. As used herein, the term "containment structure" refers to any vessel, chamber, container, or other structure suitable for isolating one environment from another, such as for holding, containing, transporting or otherwise serving as a conduit for any liquid, gas, or other fluid, slurry, fluid/solid mixture, or semi-fluid substance, whether used in an above ground, subsea, or other application. Examples of types of such containment structures include, but are not limited to, pipes, pipelines, pipe segments, pipe nipples, tee connections and other connector apparatuses, tubes and/or tubular structures, pressure and process vessels, storage tanks, chambers or other structures. In typical embodiments, a containment structure may be, for example, a carrier pipe, a branch pipe, a tee or Y-connection or fitting, ball valve, collet connector apparatus, boltless flange connector apparatus, etc. In the method of the present invention, one end of a tapping connector is typically joined to, connected to, or integrally formed with a first containment structure (such as integrally formed with a wall of a tank or pipeline). When so installed, the tapping connector thus may serve to isolate the interior of such a first containment structure, for example, by containing any internal pressure, vacuum and/or contents present within the first containment structure. A second containment structure may be optionally joined to, connected to, or formed with the other end of the tapping connector, initially or at a later time. When a second containment structure is so utilized, the tapping connector may serve to isolate the interior of the first containment structure from the second containment structure by, for example, containing any internal pressure, vacuum and/or contents present within either or both of the containment structures. When so desired, isolation or containment may be eliminated by removing the membrane from the connector using conventional tapping tools, for example, to allow the interior of a first containment structure (including any contents, vacuum, and/or pressure that may be present therein) to be exposed to the atmosphere or other environment, or to allow the interiors of first and second containment structures (including any contents, vacuum, and/or pressure that may be present in either or both of the interiors) to be exposed to one another. Such exposure may or may not result in flow or mixture of the contents of a containment structure with the atmosphere, the contents of another containment structure, or another environment. It will be understood with benefit of this disclosure that benefits of the disclosed method and apparatus may also be achieved without removal of the membrane as so described above.

In another typical embodiment, the tapping connector of this invention comprises an apparatus for sealing and/or tapping a containment structure. In this embodiment, the apparatus comprises a connector body having a bore extending between two opposing ends, and it is adapted at one end to connect to the containment structure. An arched membrane or diaphragm is disposed within the bore of the connector body, thus sealing the bore. The membrane or diaphragm comprises a longitudinal segment of a conduit arranged transverse to the bore and intersecting inner surfaces of the connector body.

In another typical embodiment, this invention comprises an apparatus for sealing and/or tapping a containment structure for holding or transporting a fluid. The apparatus comprises a first fitting having first and second ends, wherein the first and second ends define a first bore therebetween. The first end is connected to the containment structure. The apparatus further comprises a second fitting having first and second ends which define a second bore therebetween. The second fitting is connected at its first end to the second end of the first fitting to define a fluid passageway which includes the first and second bores. A membrane or diaphragm is disposed within the bore of one of the fittings, sealing the fitting, and this membrane or diaphragm is positioned to be penetrated from the second end of the second fitting. The membrane or diaphragm forms an elongated, curved arch arranged transversely relative to the bore of the fitting in which it is disposed.

In another embodiment of the invention, one end of a tapping connector is typically joined to a first containment structure. The other end of the tapping connector may then be optionally isolated or covered with an isolation structure, for example, to temporarily isolate or protect it from the elements until it is desired to make a connection to the first containment structure. In this regard, an isolation structure may be any closure means suitable for isolating, covering or protecting the other end of the membrane or membrane connector including, but not limited to, a plug, blind flange, protector flange, etc. When it is desired to make such a connection, the isolation structure may be removed and a second containment structure may then be joined to the other end of the tapping connector. Finally, the membrane of the tapping connector may be conveniently removed using conventional tapping tools.

In one typical embodiment, this invention comprises a tapping connector including a gasket face flange, a weld neck, and a curved or arcuate membrane disposed therebetween. In this embodiment, the curved or arcuate membrane offers a partially cylindrical profile that resembles the wall of a pipe. In this regard, the curved or arcuate membrane typically presents a convex profile oriented toward the gasket face flange side and a concave profile oriented toward the weld neck side. The curved or arcuate membrane is typically cast as an integral part of the flange, although other means of configuring a flange with a curved or arcuate membrane are possible including, but not limited to, shaped or closed-die forgings, a welded-in membrane in a standard weld neck flange or other types of flanges, etc. A sealing groove or other sealing means may be provided on the gasket face flange side of the membrane. Sealing means on the gasket face flange side of the membrane may include, but is not limited to, raised face flanges or seals, ring type joints, or any other sealing means known in the art.

In another embodiment, this invention comprises a method for connecting a branch pipe to a carrier pipe. In this method, a weld neck of a tapping connector embodiment described herein is typically welded to a tee placed in the carrier pipe, such that the convex side of the membrane is presented outward and away from the carrier pipe. A blind flange or protector flange is then typically installed on the gasket face flange side of the tapping connector for protection of the sealing groove of the gasket face flange. When so installed, the membrane blocks the bore of the flange and thus contains the internal pressure and/or contents of the pipeline. Advantageously, when it is desired to make a connection at the tapping connector, the blind flange or protector flange may be removed and the membrane cut out or tapped by using conventional tapping tools. In this regard, the convex profile of the membrane allows conventional tapping tools to be employed with easy removal of chips.

DETAILED DESCRIPTION OF THE PREFERRED EMBODIMENTS

Figure 1:
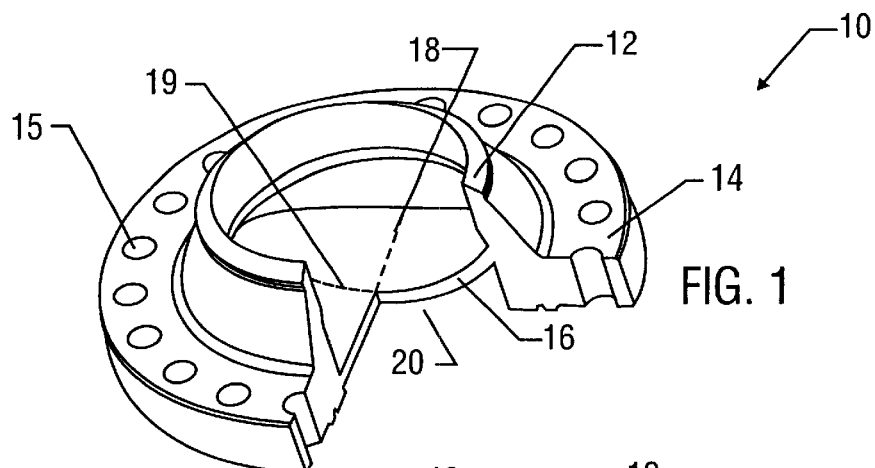
FIG. 1 shows an isometric quarter sectional view of one typical embodiment of the disclosed tapping connector as viewed from the weld neck side.
Figure 2:
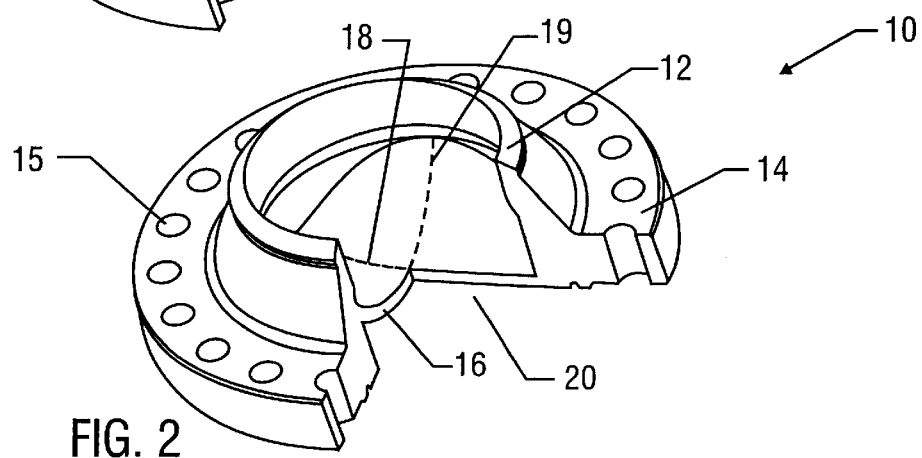
FIG. 2 shows an isometric quarter sectional view of one typical embodiment of the disclosed tapping connector as viewed from the weld neck side.
Figure 3:
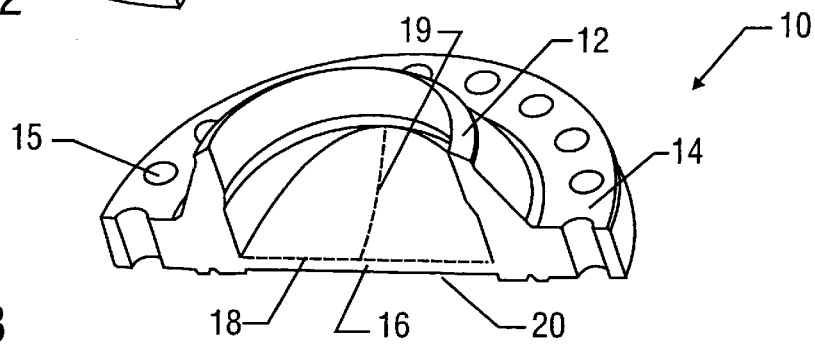
FIG. 3 shows an isometric side sectional view of one typical embodiment of the disclosed tapping connector as viewed from the weld neck side.
Figure 4:
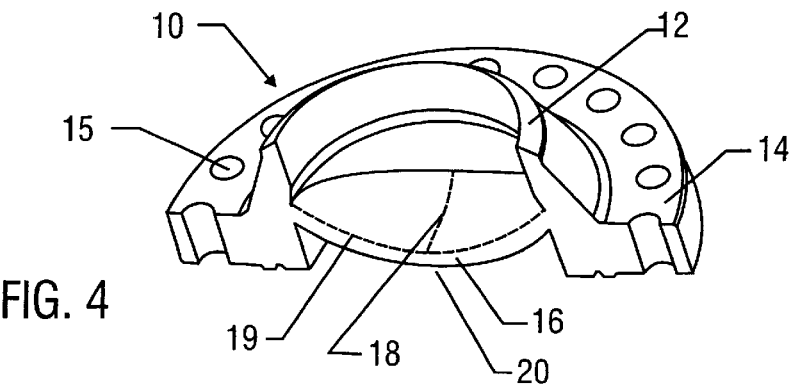
FIG. 4 shows an isometric side sectional view of one typical embodiment of the disclosed tapping connector as viewed from the weld neck side.
Figure 5:
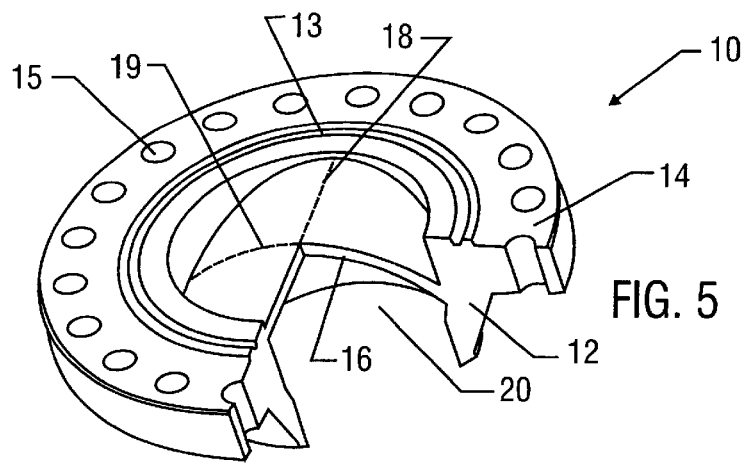
FIG. 5 shows an isometric quarter sectional view of one typical embodiment of the disclosed tapping connector as viewed from the gasket face flange side.
Figure 6:
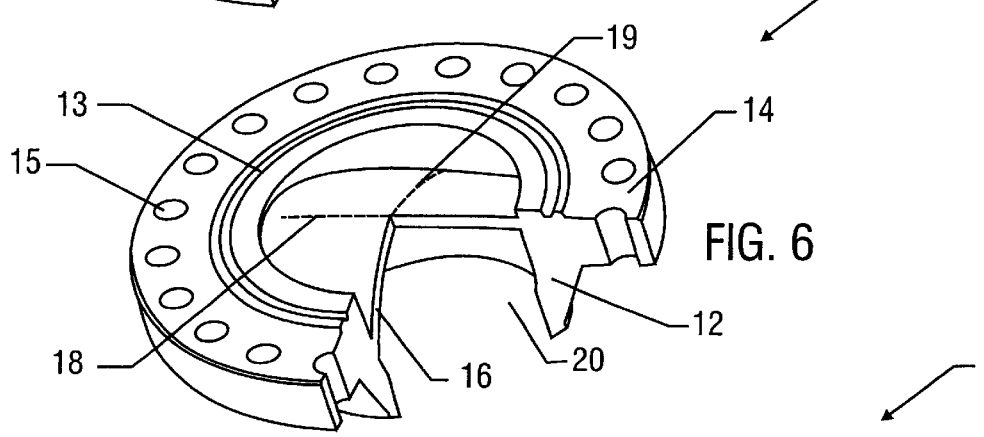
FIG. 6 shows an isometric quarter sectional view of one typical embodiment of the disclosed tapping connector as viewed from the gasket face flange side.
Figure 7:
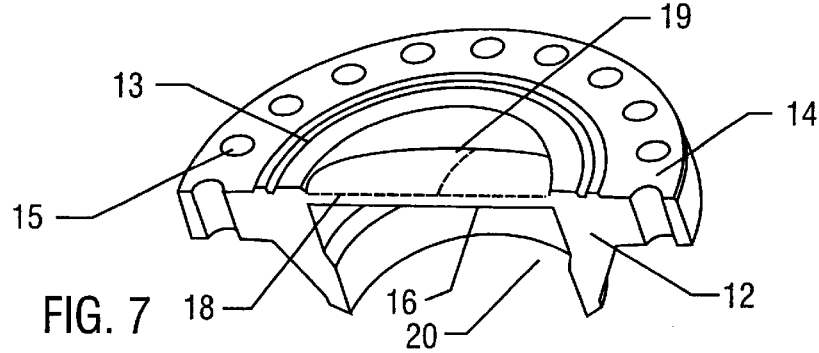
FIG. 7 shows an isometric side sectional view of one typical embodiment of the disclosed tapping connector as viewed from the gasket face flange side.
Figure 8:
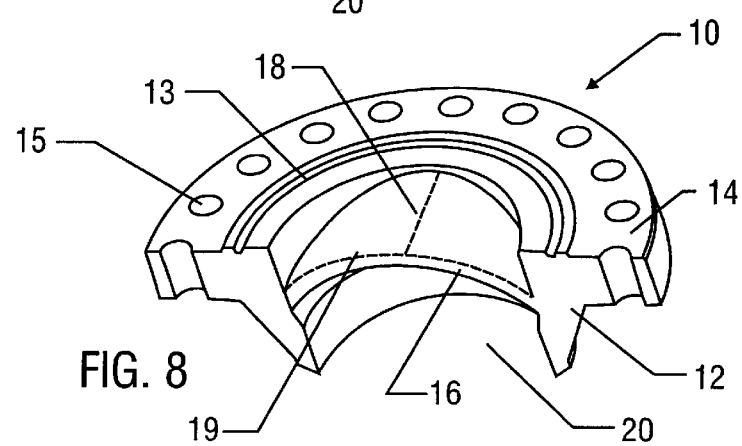
FIG. 8 shows an isometric side sectional view of one typical embodiment of the disclosed tapping connector as viewed from the gasket face flange side.

Conventional tapping or cutting equipment is typically designed to cut perpendicularly through a cylindrically-shaped tubular section, such as a pipeline wall, using tapping equipment such as those made by T. D. Williamson, IPSCO, and others. In this regard, a cylindrical shape lends itself well to clearing the accumulation of cutting chips produced by a tapping operation as each tooth of the cutter repeatedly rotates from a cutting mode into a clearing mode in which the cutting chips may be freely deposited or cleared from the cutting area. However, when attempting to cut a profile shape (such as a substantially flat or dome-shaped surface) that does not provide this natural clearing action, the teeth on the cutter tend to become impacted or clogged, thus impeding cutting efficiency and progress. Consequently, when cutting such shaped profiles, a cutter must be retracted periodically to allow the teeth to clear. Since typical conventional cutting tools are not designed for this advance-retract-type action, clearing of the teeth may become a time-consuming and costly task.

Similarly, tooth-clogging can occur in other situations, for example, when cutting small-diameter branch outlets into larger-diameter pipe where, at some time during the progress of the cut, a cutter's teeth may become fully engaged in the pipe wall and not allowed to clear. As a rule of thumb, this phenomenon tends to occur, for example, when the following theoretical condition for minimum tapping diameter (d) is not satisfied:

$$d \geq 2\sqrt{Dt-t^2}$$

As an example, for a 12.75" outer diameter pipeline having a 0.75" wall thickness (t) and an inner diameter (D) of 11.25", clogging phenomenon may be encountered when conventionally tapping the pipeline with a tapping bore having a theoretical diameter (d) that is about 5.61 inches or less. Therefore, when it is desired to avoid tooth clogging problems using conventional tapping methods (i.e., when directly tapping a pipeline wall), minimum branch bore diameter is typically limited by pipeline size. Furthermore, when using conventional tapping methods a tapping bore diameter is typically selected to be somewhat larger than the minimum tapping diameter of the pipeline to help assure effective chip clearing, further limiting the minimum size of a branch bore. This is typically done because the theoretical minimum tapping bore diameter (d) only serves to establish a threshold and does not account for burrs around the cutter kerf which may impede tooth clearing efficiency.

Advantageously, embodiments of the disclosed tapping connector allow the membrane radius to be optimally varied to match the particular requirements for cutting a branch bore, thereby allowing bores having an inner diameter smaller than the theoretical minimum diameter (d) to be cut in a carrier pipe without sacrificing tooth clearing efficiency. For example, a tapping connector may be provided with an arcuate membrane having an effective outer surface (or convex) radius that is smaller than the outer radius of the pipeline or carrier pipe to which it is connected. In this case, carrier pipe radius or diameter does not limit the tapping bore diameter as previously described for conventional tapping operations.

In other embodiments, a membrane may be sized to have an effective outside surface radius or diameter equal to or greater than the outer radius or diameter of a carrier pipe to which the tapping connector is to be installed. In one most typical embodiment, a membrane radius is initially selected to have an effective outside surface diameter of about 125% of the outer diameter of the carrier pipe. For example, a membrane for a carrier pipe having an actual outer diameter of about 12.75" (12" nominal pipe) may be sized to have an outer membrane surface diameter of about 16" and a membrane thickness of about 1". Similarly, membranes for 10" and 24" nominal carrier pipes may be sized to have effective outer membrane surface diameters of about 13.25" and about 30", respectively, and to have membrane thicknesses of about 1" and about 1.25", respectively. It will be understood with benefit of the present disclosure that based on allowable design stresses and dimensional and geometric considerations, the membrane outer surface radius may be further optimized to be lesser or greater than an initial membrane radius selection, for example to satisfy controlling specifications such as ANSI B16.5 for flange length, etc.

In the case of a tapping connector for a 12" nominal carrier pipe, a 12" ring type joint (RTJ) or flat faced flange may be provided on the convex (or tapping side) of the membrane and a 12" weld neck with standard weld bevel provided on the concave side of the membrane for attachment to the carrier pipe. In one most typical embodiment, the inner bore or diameter of the tapping connector is typically full opening or full bore (in this case about 12") on the convex side of the membrane so as to be compatible with conventional tapping tools. The inner diameter of the tapping connector on the weld bevel side may be varied, typically sized to match the carrier pipe inner diameter or other requirements. In some cases, the inner diameter on the concave side of the membrane may be selected to match a minimum bore or maximum wall thickness of carrier pipe, and then bored out later to meet a particular application. Furthermore, it will be understood that the dimensions and configurations of the above-described embodiments are exemplary only, and that many other dimensions, configurations, and combinations thereof are possible including, but not limited to, those described elsewhere herein.

As shown in FIGS. 1–20, embodiments of the disclosed tapping connector 10 provide blockage of a branch bore 20 by incorporating a partially cylindrical-shaped, integral membrane 16. The curved or arcuate shape of the blocking membrane 16 of the proposed connector may be optimally radiused to promote cutter tooth clearing with existing equipment. Furthermore, the radius of the curved or arcuate shape may be chosen independent of carrier pipe diameter. Advantageously, this curved or arcuate shape lends itself well to clearing the accumulation of cutting chips produced by a tapping operation as each tooth repeatedly rotates from a cutting mode into a clearing mode in which the cutting chips are freely deposited.

Embodiments of the disclosed tapping connector 10 may be used as a branch tap connector, in one example, to provide a tee connection to a carrier pipe. In this regard, any suitable tools and/or devices known in the art may advantageously be employed to facilitate branch connections, including tools that provide for tapping a carrier pipe while material is flowing under pressure through the carrier pipe. Examples of suitable cutting or tapping tools include, but are not limited to, T. D. Williamson or IPSCO tapping machines.

Advantageously, the disclosed tapping connector may be used in a variety of applications to connect a tie-in line or branch line to a carrier pipeline or other conduit. Examples of such applications include, but are not limited to, those situations involving a carrier pipe and branch pipe designed to carry a wide variety of materials such as oil, refined oil products, crude oil and gas with associated water, gaseous or liquid materials and other flammable or potentially hazardous organic substances, etc. Although the disclosed tapping connector may be used to provide a connection point for any type of conduit, it is particularly well suited in applications where it is undesirable to weld a connector to the carrier pipe, such as when the pipe is submersed undersea or when the pipe carries flammable or potentially hazardous substances, or when the pipe is in an environment where potentially flammable or explosive fumes are present. The disclosed tapping connector and associated method are also well-suited in a variety of other applications including, but not limited to, use with containment structures in surface oil facilities, chemical refineries, municipal water systems, industrial cooling water systems, and in any other application wherein liquid or gaseous substances or fluid/solid mixtures are contained and/or made to flow through pipeline systems or networks.

Referring to FIGS. 1–8, there is seen a representation of one embodiment of the disclosed tapping connector. In this embodiment, a tapping connector 10 includes a gasket face flange 14, a weld neck 12, and a curved or arcuate membrane 16. FIGS. 1–4 represent sectioned views of the tapping connector 10 as viewed from the weld neck side. FIGS. 5–8 show sectioned views of the tapping connector 10 as viewed from the gasket face flange side. As shown in FIGS. 1–8, membrane 16 offers a cylindrical profile that resembles the wall of a pipe. In this regard, membrane 16 has a longitudinal centerline 18 that is oriented as shown by dashed lines in the drawings. As shown in FIGS. 1–8, curved or arcuate membrane 16 presents a convex profile oriented toward the gasket face flange side and a concave profile oriented toward the weld neck side.

As shown in FIGS. 1–8, gasket face flange 14 typically includes a plurality of transverse flange bores 15 for receiving bolts or studs, for example, to secure gasket face flange 14 to a secondary branch flange and pipe, not shown. Tapping connector 10 typically defines a branch tap bore 20 through which the material in a branch pipe, not shown, may flow to or from the carrier pipe once the membrane has been removed. It will be understood with benefit of this disclosure that an optional gasket or an elastomeric seal ring seated in a recess 13 of the gasket face flange 14 may be additionally used when securing the gasket face flange 14 to the secondary pipe and flange. It will further be understood with benefit of this disclosure that, while a RTJ is shown in the embodiment of FIGS. 1–8, the tapping connector disclosed herein may make use of any other sealing technology known in the art, including, but not limited to, raised face flange seals, and various proprietary sealing means.

As seen in FIGS. 1–4, the diameter of branch bore 20 of tapping connector 10 typically widens incrementally between the terminus of weld neck 12 and curved or arcuate membrane 16. This optional flared shape helps ensure adequate clearance for a cutter or tapping tool, not shown, regardless of branch line wall thickness. Other possible configurations of weld neck 12 include, but are not limited to, uniform bore diameters for purpose-designed applications or reverse-taper bores for bore reduction.

Figure 9:
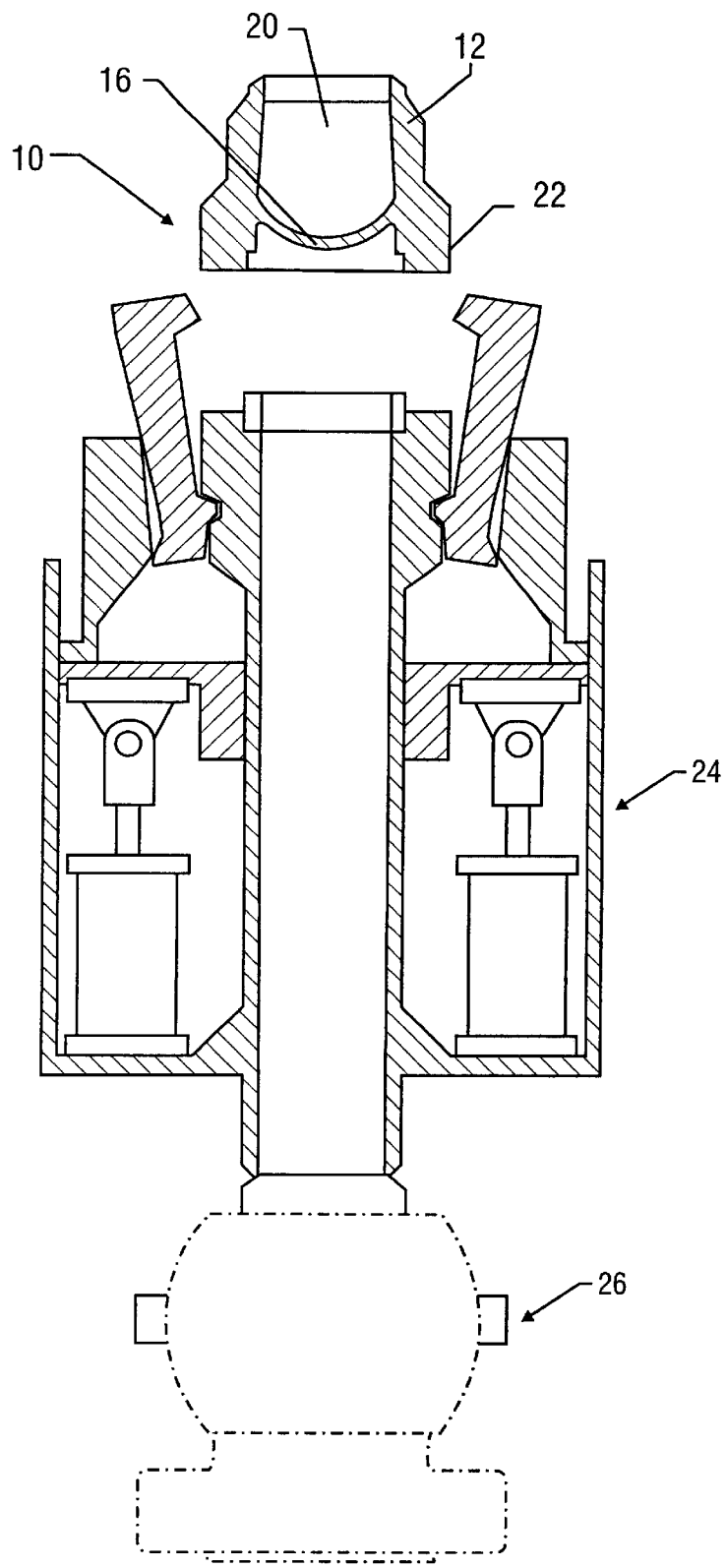
FIG. 9 shows a side sectional view of one typical embodiment of the disclosed tapping connector, wherein the tapping connector is integral with the male section of a collet connector.

Although one typical embodiment of the disclosed tapping connector is shown in FIGS. 1–8, alternative embodiments are also possible. For example, referring to FIG. 9, there is seen a representation of another embodiment of the disclosed tapping connector. In this embodiment, a tapping connector 10 includes a curved or arcuate membrane 16 integral with a collet connector male section 22. As shown, collet connector male section 22 and weld neck 12 define a bore 20, with curved or arcuate membrane 16 disposed therebetween. In one embodiment, collet connector male section 22 may be inserted into collet connector female section 24 and securely fastened therewith. FIG. 9 further depicts, with the use of dashed lines, an optional ball valve 26, which may be joined with collet connector female section 24.

In the embodiment of FIG. 9, curved or arcuate membrane 16 offers a profile that resembles the wall of a pipe, and in this regard, membrane 16 is defined by a generally linear longitudinal centerline, not shown, and a generally curved latitudinal centerline, also not shown. In this embodiment, these centerlines are approximately perpendicular to one another. However, it will be understood with benefit of this disclosure that the shape and/or orientation of a membrane may vary substantially as described elsewhere herein. As shown in FIG. 9, curved or arcuate membrane 16 presents a concave profile oriented toward the weld neck side and a convex profile oriented toward the collet connector male section side.

Figure 10:
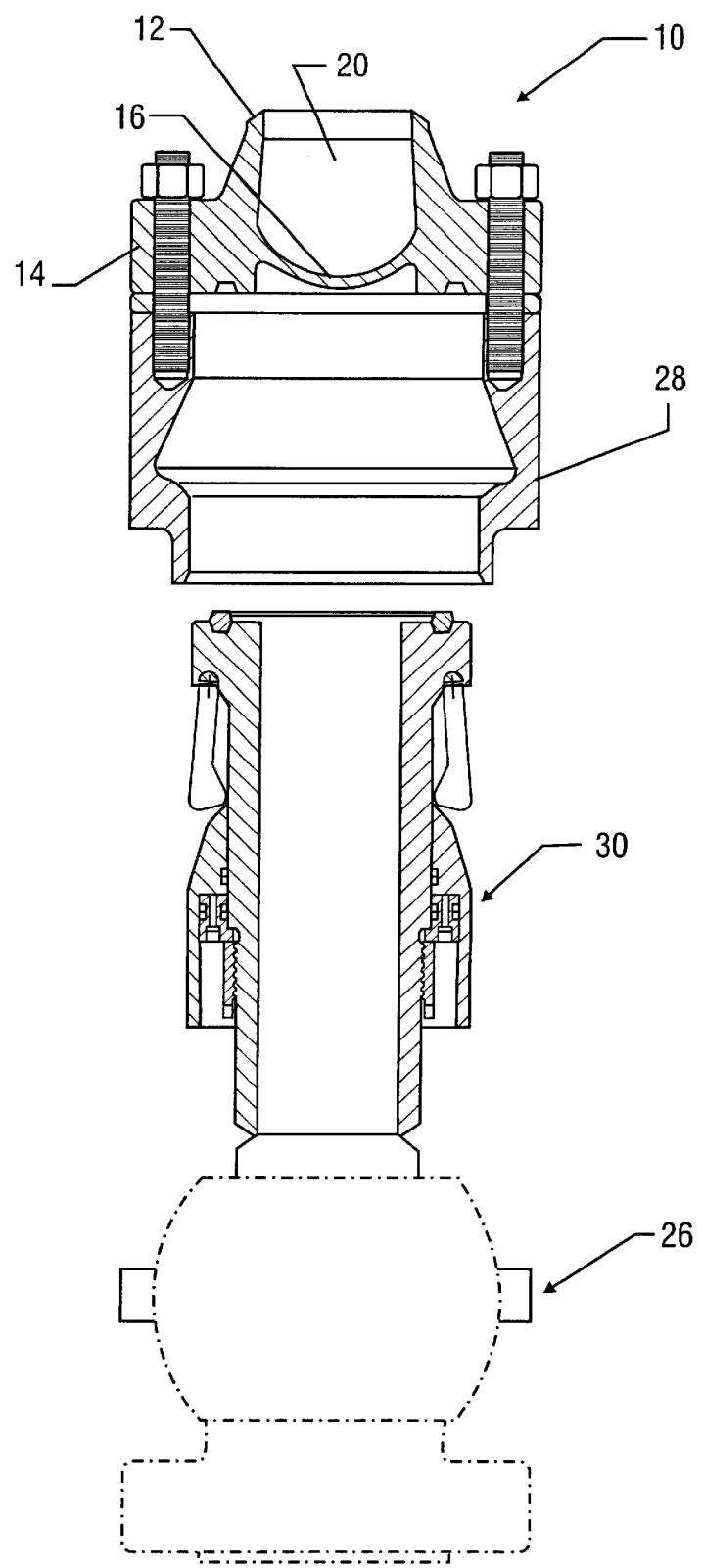
FIG. 10 shows a side sectional view of one typical embodiment of the disclosed tapping connector, wherein the tapping connector is bolted to a boltless flange female section.

Referring to FIG. 10, there is seen a representation of another embodiment of the disclosed tapping connector. In this embodiment, a tapping connector 10 includes a curved or arcuate membrane 16 integral with a gasket face flange 14 and a weld neck 12. As shown, gasket face flange 14 and weld neck 12 define a bore 20, with curved or arcuate membrane 16 disposed therebetween. In one embodiment, gasket face flange 14 may be bolted to boltless flange female section 28, and boltless flange male section 30 may be inserted into boltless flange female section 28 and securely fastened therewith. FIG. 10 further depicts, with the use of dashed lines, an optional ball valve 26, which may be joined with boltless flange male section 30.

In the embodiment of FIG. 10, curved or arcuate membrane 16 offers a profile that resembles the wall of a pipe, and in this regard, membrane 16 is defined by a generally linear longitudinal centerline, not shown, and a generally curved latitudinal centerline, also not shown. In this embodiment, these centerlines are approximately perpendicular to one another. However, it will be understood with benefit of this disclosure that the shape and/or orientation of a membrane may vary substantially as described elsewhere herein. As shown in FIG. 10, curved or arcuate membrane 16 presents a concave profile oriented toward the weld neck side and a convex profile oriented toward the collet connector male section side.

Although one typical embodiment of the disclosed tapping connector is shown in FIGS. 1–8, and other typical embodiments are shown in FIGS. 9 and 10, further alternative embodiments are also possible. For example, referring to the embodiment shown in FIGS. 1–8, curved or arcuate membrane 16 may alternately be formed to present a concave profile toward a gasket face flange side and a convex profile toward a weld neck side. Furthermore, while the tapping connector 10 depicted in FIGS. 1–8 comprises a gasket face flange 14 on one side and a weld neck 12 on the other side, either or both sides of a tapping connector 10 may alternatively be fitted with any suitable connection type known in the art, including, but not limited to, a gasket face on both sides (see FIG. 13), a weld neck on both sides (see FIG. 14), a collet connector on at least one side (see FIG. 9), a ball flange and a ball valve on at least one side(see FIG. 15), with any of the aforementioned end pieces on the other side, or other mixtures and combinations of other connectors known in the art. A few examples of other possible embodiments are described below.

Figure 13:
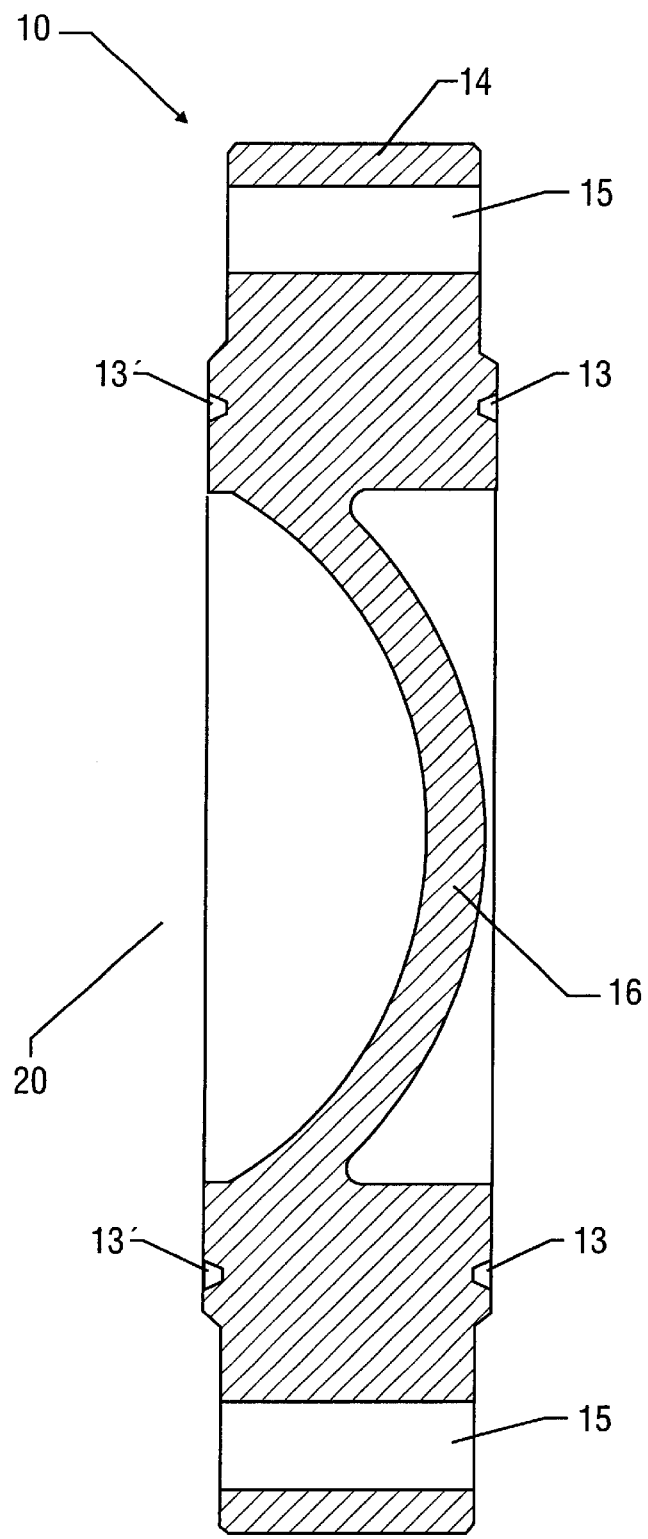
FIG. 13 shows a side sectional view of one typical embodiment of the disclosed tapping connector.

Referring to FIG. 13, there is seen a representation of an embodiment of the disclosed tapping connector having a gasket face on both sides. In this regard, recesses 13 and 13' are designed to accommodate a gasket or elastomeric seal ring.

Figure 14:
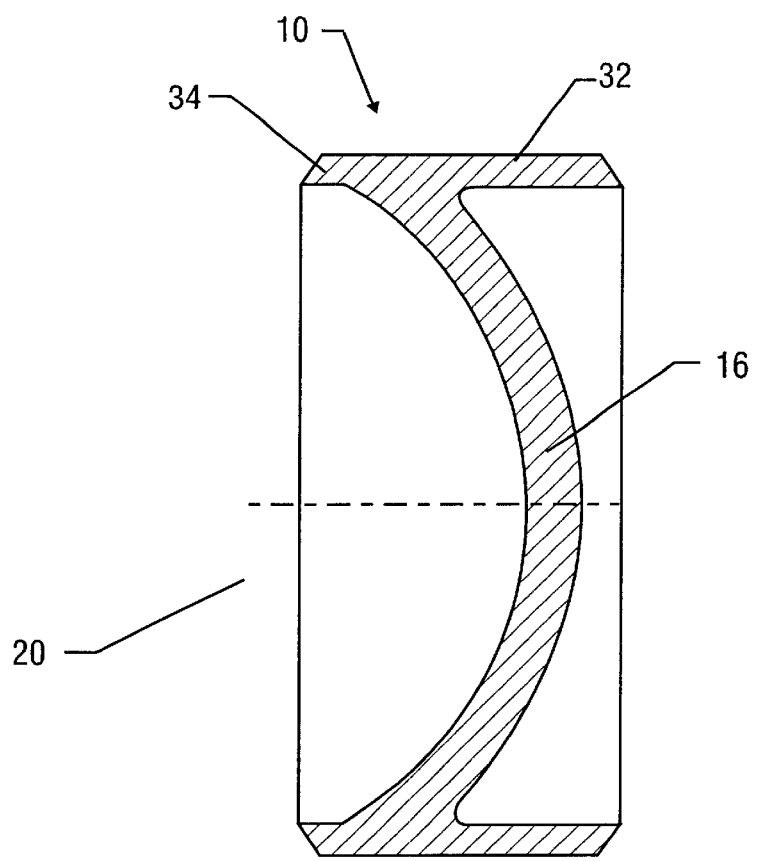
FIG. 14 shows a side sectional view of one typical embodiment of the disclosed tapping connector.

Referring to FIG. 14, there is seen a representation of another embodiment of the disclosed tapping connector having weld necks 32 and 34 on both sides. Weld neck 32 is seen to adjoin the convex side of membrane 16, while weld neck 34 is seen to adjoin the concave side of membrane 16.

Figure 11:
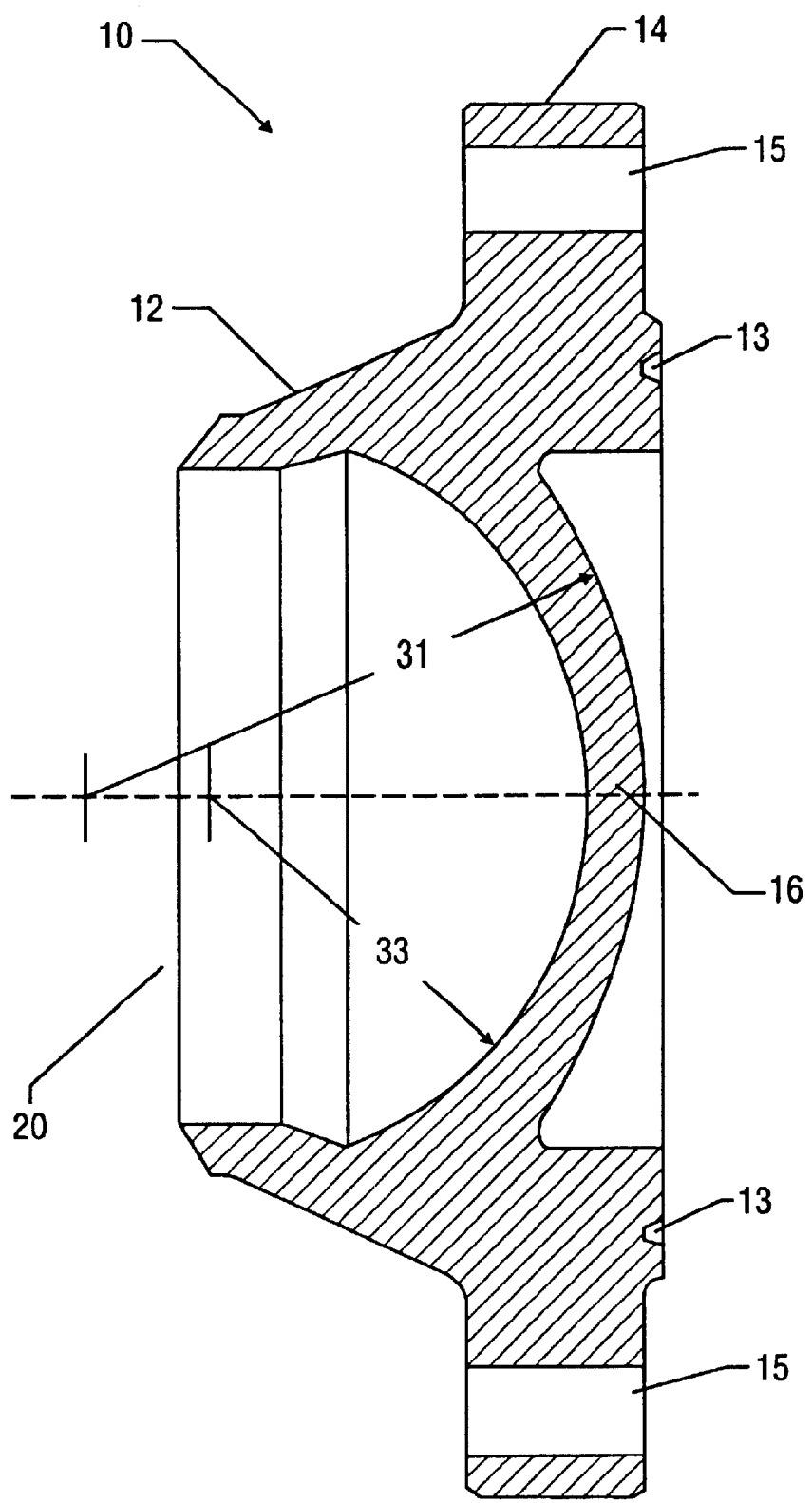
FIG. 11 shows a side sectional view of one typical embodiment of the disclosed tapping connector.
Figure 12:
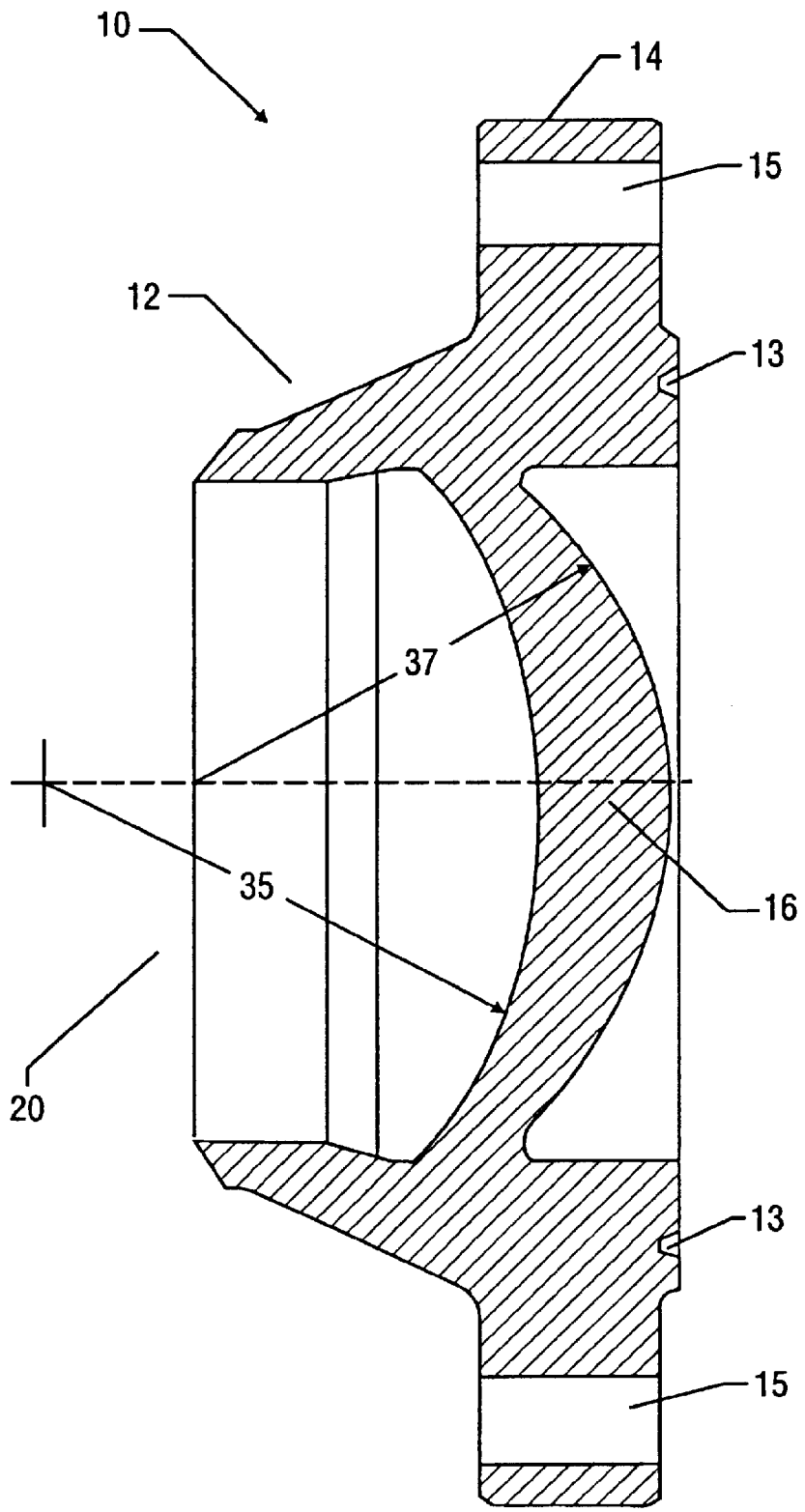
FIG. 12 shows a side sectional view of one typical embodiment of the disclosed tapping connector.

In embodiments of the disclosed method and apparatus, a membrane 16 of the tapping connector is typically defined by an outer convex surface, as best seen in FIGS. 5–8, and an inner concave surface, as best seen in FIGS. 1–4, wherein these outer and inner surfaces are each characterized by a radius of curvature. The membrane of the tapping connector may further be defined by a generally linear longitudinal centerline 18 and a generally curved latitudinal centerline 19. For example, as shown in FIGS. 1–8, the dashed line of element 18 represents the longitudinal centerline, while the dashed line of element 19 represents the latitudinal centerline. In the embodiment of FIGS. 1–8, these centerlines are approximately perpendicular to one another, thus presenting a substantially cylindrical shape. However, it will be understood with benefit of this disclosure that the shape of a membrane 16 may vary substantially. For example, the outer and inner membrane surfaces may have similar radii of curvature and therefore be coaxial with one another, in which case the membrane may comprise a generally constant and arcuate cross sectional profile, as depicted in the embodiments of FIGS. 1–10 and 13–19. In another embodiment, the outer, convex surface may be defined by a larger radius of curvature than that of the inner, concave surface. As shown in FIG. 11, for example, convex radius 31 is greater than concave radius 33, to an extent resulting in a membrane profile as shown. In yet another embodiment, the outer, convex surface may be defined by a smaller radius of curvature than that of the inner, concave surface. As shown in FIG. 12, for example, concave radius 35 is greater than convex radius 37, to an extent resulting in a membrane profile as shown.

In the embodiments of the disclosed tapping connector, a typical curved or arcuate membrane 16 is constructed of materials including, but not limited to, carbon-manganese steel (ASTM A216, A352, or similar), alloy steel, or corrosion resistant alloy materials. Membrane 16 is typically cast as an integral part of a tapping connector 10, although other means of configuring a tapping connector 10 with a curved or arcuate membrane 16 are possible, for example, a tubular sleeve with membrane for welding to a valve. The thickness of membrane 16 may be varied in accordance with the pressure rating and intended usage of tapping connector 10. For example, higher pressure and/or higher temperature applications may require a correspondingly thicker membrane. However, use of higher strength materials in manufacturing the tapping connector of the present invention typically permit the use of a relatively thinner membrane while maintaining the same pressure rating. Other considerations in choosing membrane thickness include economy of manufacture and ease of tapping.

A tapping connector may be constructed using any suitable connector fabrication method or configuration known in the art. Typically, a tapping connector is constructed of one-piece metal and cast or machined to provide a desired size and shape. However, other constructions and design configurations are possible, such as shaped or closed-die forgings. A tapping connector may be constructed of a variety of metals or alloys of metals. Typical materials from which to prepare the tapping connector include steel, steel alloys and corrosion resistant metal alloys including, but not limited to, ASTM A216, A352, and 825. It will be understood with benefit of this disclosure that particular alloys may be selected using standard material specifications and selection methods for any given application and, in this regard, such specifications are well known in this art. A tapping connector may further be cast or machined from any other material known in the art, including, but not limited to, plastics such as polyvinyl chloride (PVC) and polyethylene, and/or may be used for providing connections to plastic or fiberglass containment structures, such as carrier pipes and/or branch pipes.

Figure 18:
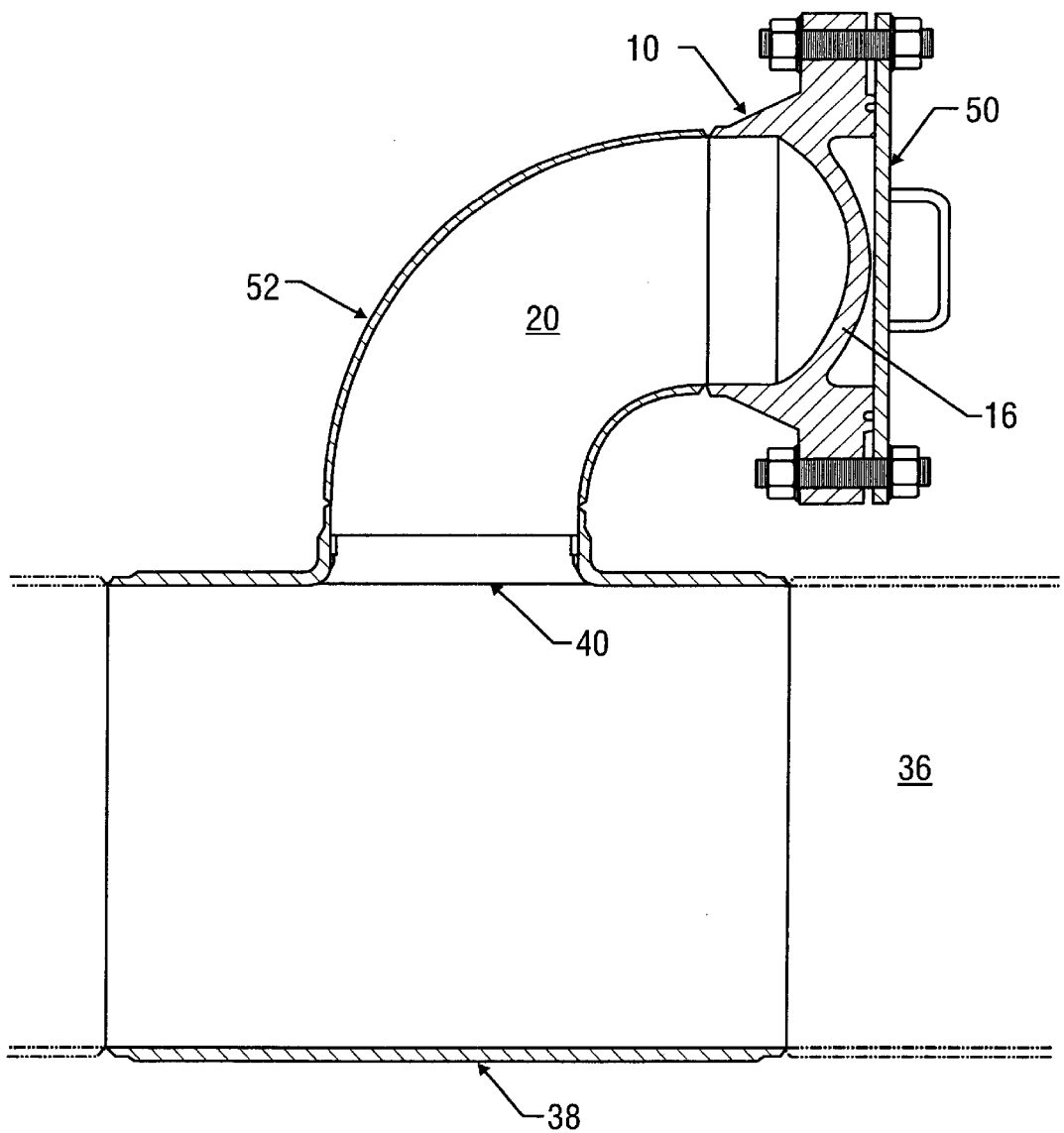
FIG. 18 shows a side sectional view of one typical embodiment of the disclosed tapping connector, wherein the tapping connector is welded to an elbow on one side and bolted to a protector flange on another side.
Figure 20:
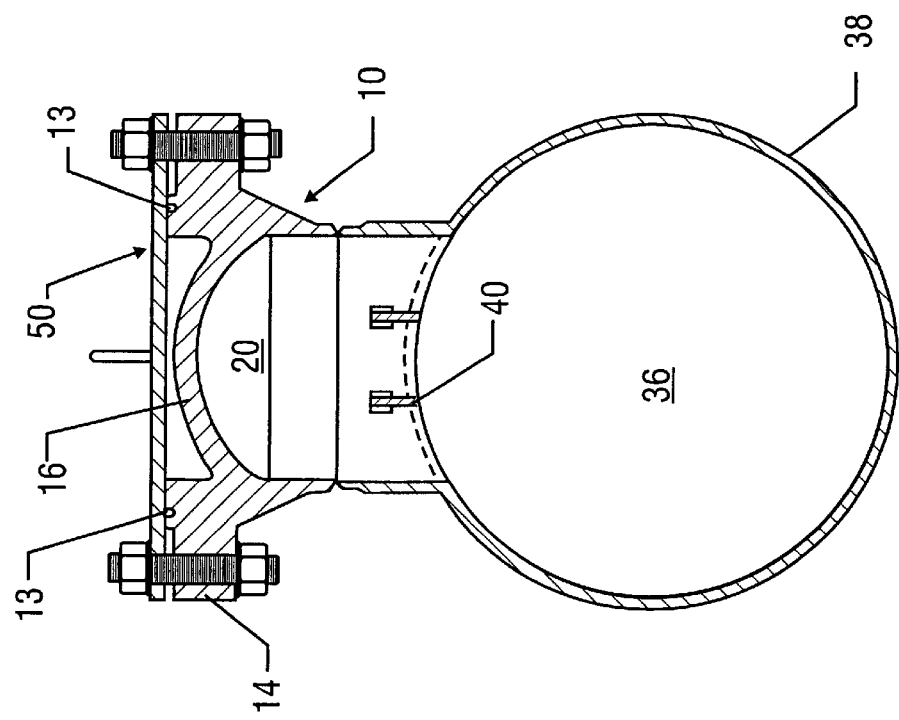
FIG. 20 shows a cross sectional view of one typical embodiment of the disclosed tapping connector, wherein the tapping connector is welded to a carrier pipe tee on one side and bolted to a protector flange on another side.
Figure 19:
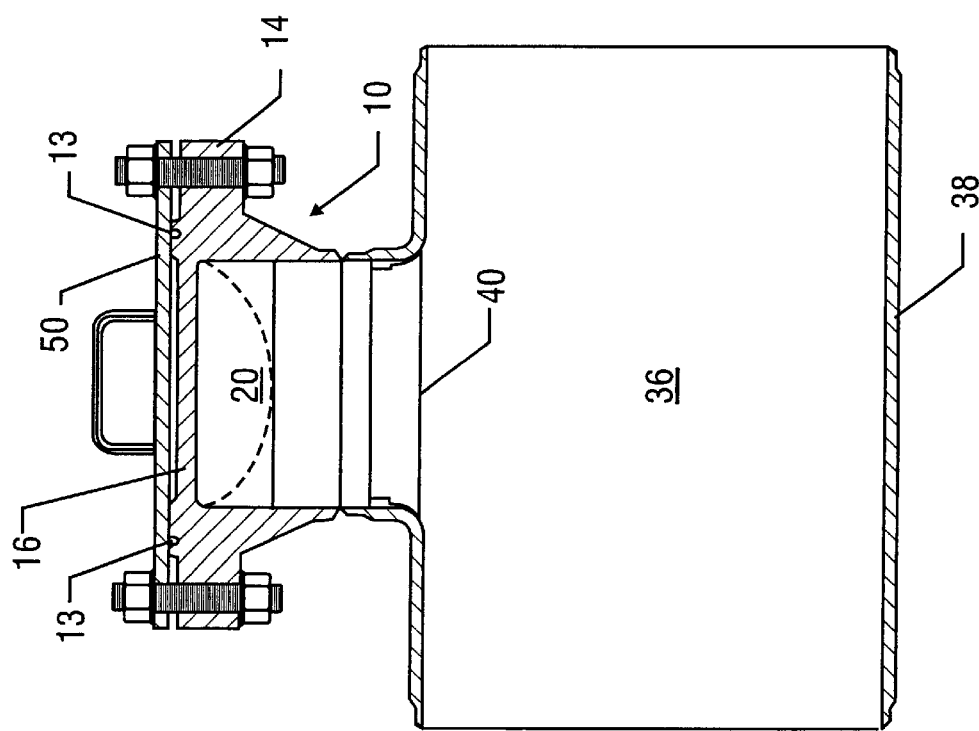
FIG. 19 shows a side sectional view of one typical embodiment of the disclosed tapping connector, wherein the tapping connector is welded to a carrier pipe tee on one side and bolted to a protector flange on another side.

In one possible installation of the embodiment of FIGS. 1–8, weld neck 12 of tapping connector 10 may be welded to a tee 38 placed in a pipeline or other carrier pipe during initial construction, as illustrated in FIGS. 19 and 20. In an alternative installation of the embodiment of FIGS. 1–8, weld neck 12 of tapping connector 10 may be connected to a carrier pipe tee 38 via an elbow 52, as illustrated in FIG. 18. A blind flange, not depicted, or a protector flange 50 may then be installed on the gasket face flange side of tapping connector 10 for protection of sealing groove 13 of gasket face flange 14 (refer to FIGS. 1–8, and 18–20). When so installed, membrane 16 blocks the branch bore 20 of the tapping connector 10 and thus acts to isolate and/or contain any internal pressure within the pipeline. When it is desired to make a connection at the tapping connector 10, the blind flange or protector flange 50 may be removed from tapping connector 10, exposing membrane 16. Membrane 16 may then be removed using conventional tapping tools. In this regard, the convex profile of membrane 16 allows conventional tapping tools to be employed with easy removal of chips.

Advantageously, in those embodiments employing a tee connection, membrane 16 of tapping connector 10 is typically sufficiently displaced from the inner diameter 36 of the transmission pipeline (and the tee fitting which connects it to the pipeline) to allow pigging bars 40 or any other form of pig guide to be pre-installed in the branch bore, as illustrated in FIGS. 18–20. Subsequent tapping removal of membrane 16 may therefore be conducted without risk of cutting or otherwise engaging the pig guide. As a further advantage, since pig guide device(s) are pre-installed at the time a pipeline is laid, costly installation time is reduced or eliminated.

Figure 15:
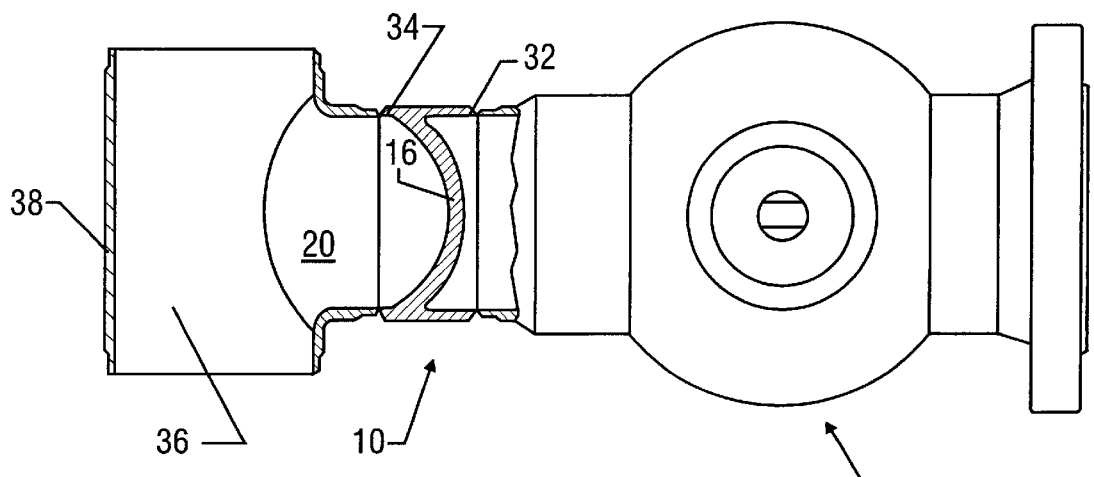
FIG. 15 shows a side sectional view of one typical embodiment of the disclosed tapping connector, wherein the tapping connector is welded between a carrier pipe tee and a ball valve.

In one possible installation of the embodiment of FIG. 14, weld neck 34 of tapping connector 10 may be welded to a tee 38 (see, for example, FIGS. 15, 16, and 17) placed in a pipeline or other carrier pipe during initial construction. FIG. 15 shows an embodiment of the disclosed tapping connector wherein weld neck 34 of tapping connector 10 is welded to tee 38 placed in a carrier pipe, and weld neck 32 is welded to ball valve 26. In this embodiment, conventional tapping tools, not shown, may be employed to reach through ball valve 26 to remove membrane 16 in a manner previously described. Advantageously, the convex, curved or arcuate profile of membrane 16 permits easy clearing of chips from the cutter teeth.

Figure 16:
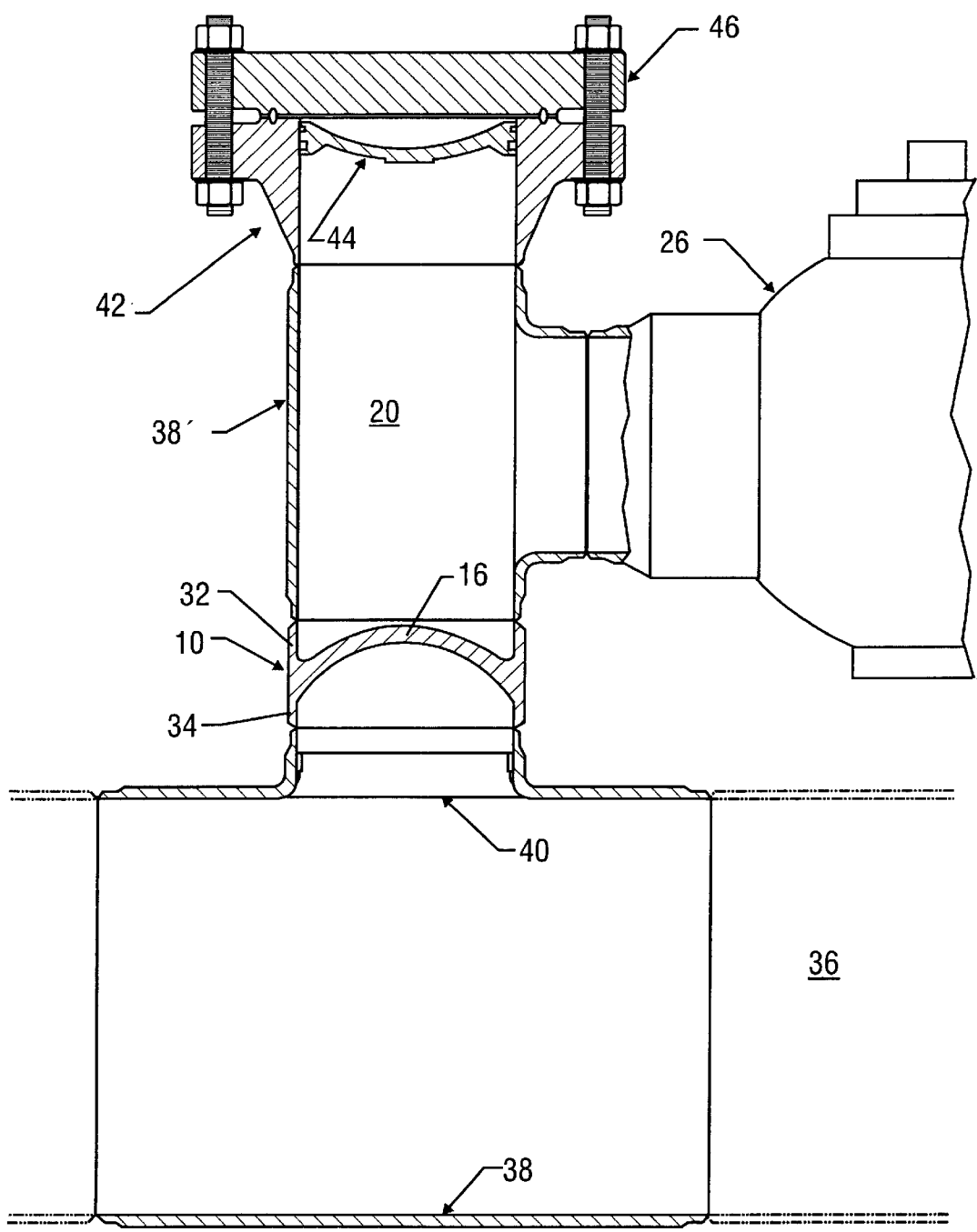
FIG. 16 shows a side sectional view of one typical embodiment of the disclosed tapping connector, wherein the tapping connector is welded between a carrier pipe tee and a branch tee.
Figure 17:
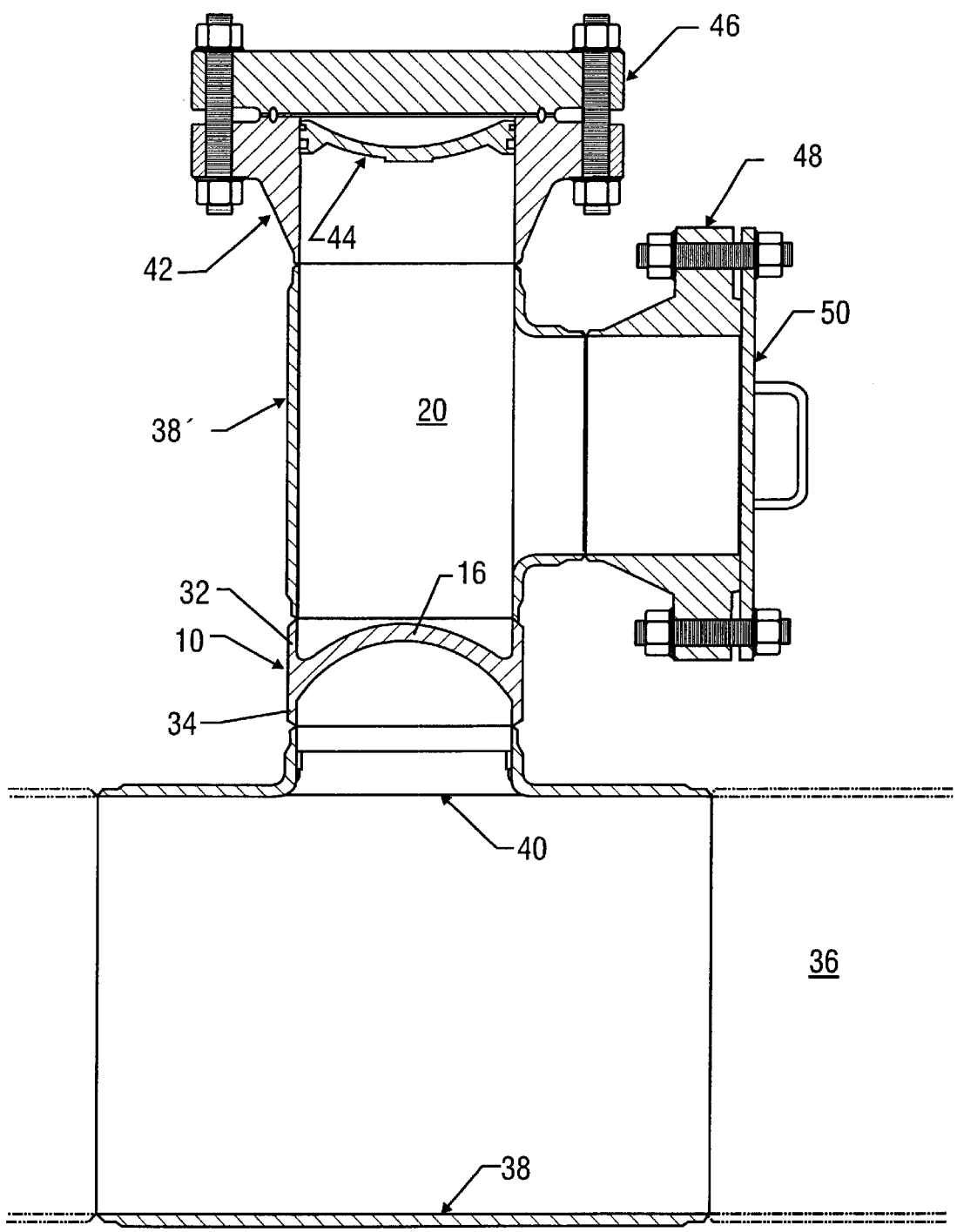
FIG. 17 shows a side sectional view of one typical embodiment of the disclosed tapping connector, wherein the tapping connector is welded between a carrier pipe tee and a branch tee.

FIGS. 16 and 17 depict other possible installations of the embodiment of FIG. 14, wherein tapping connector 10 joins carrier pipe tee 38 with branch tee 38'. In FIG. 16, branch tee 38' is connected to blocking flange 42 and ball valve 26. Blocking flange 42 contains removable blocking plug 44 which may be covered by blind flange 46. In FIG. 17, branch tee 38' is connected to blocking flange 42 and weld neck flange 48. Blocking flange 42 contains removable blocking plug 44 which may be covered by blind flange 46. Weld neck flange 48 is covered by protector flange 50. When it is desired to make a connection at tapping connector 10 in the installations of FIGS. 16 and 17, blind flange 46 may be removed from blocking flange 42, and blocking plug 44 may be removed, exposing membrane 16. Membrane 16 may then be removed using conventional tapping tools. Advantageously, the convex profile of membrane 16 allows conventional tapping tools to be employed with easy removal of chips. Note that in the embodiments of FIGS. 16 and 17, tapping connector 10 is sufficiently displaced from carrier pipe bore 36 to allow pre-installation of optional pigging bars 40.

The tapping connector of this invention may be of various sizes but, typically, is adapted to fit carrier pipe of from about 2½ inches in external diameter to about 48 inches in external diameter, more typically from about 4 inches to about 36 inches, and most typically from about 8 inches to about 24 inches in external diameter. It will be understood with benefit of the present disclosure that a tapping connector may also be employed with carrier pipes of less than about 2½ inches in external diameter and greater than about 48 inches in external diameter. Typically, the tapping connector of the present invention may be used to connect carrier pipes of a given diameter to branch line pipes of a lesser diameter. However the tapping connector of the present invention may also be used to connect carrier pipes of a given diameter to branch line pipes of a greater diameter. As disclosed hereinabove, the radius of the curved or arcuate shape of the membrane of the tapping connector may be chosen independent of carrier pipe diameter.

It will be understood with benefit of the present disclosure that a tapping connector may also be employed in applications other than those involving connection of a branch pipe to a carrier pipe. For example, the disclosed tapping connector may be employed in any application requiring the joining of two containment structures. As used herein, the term "containment structure" refers to any pipe, pipeline, pipe segment, nipple, tee, tube, tubular structure, vessel, storage tank or other structure intended to hold, contain, transport or otherwise serve as a conduit for any liquid, gas, or other fluid or semi-fluid substance, whether used in an above ground, subsea, or other application. A containment structure may be, for example, a carrier pipe, a branch pipe, a tee or Y-connection, ball valve, collet connector apparatus, boltless flange connector apparatus, etc.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and devices may be utilized in various combinations and/or independently. Thus the invention is not limited to only those combinations shown herein, but rather may include other combinations.

What is claimed is:

1. A tapping connector, comprising a connector body having a bore;

a membrane disposed in said connector body and sealing said bore, said membrane being defined by an inner convex surface and an outer concave surface, said inner and outer surfaces each being characterized by a radius of curvature; and wherein said membrane is further defined by a generally linear longitudinal centerline and a generally curved latitudinal centerline, said centerlines being approximately perpendicular to one another.

2. The tapping connector of claim 1, wherein said outer and inner membrane surfaces have similar radii of curvature and are therefore coaxial with one another, thus defining an arcuate profile.

3. The tapping connector of claim 1, wherein said outer convex surface is defined by a larger radius of curvature than said inner concave surface.

4. The tapping connector of claim 1, wherein said outer convex surface is defined by a smaller radius of curvature than said inner concave surface.

5. The tapping connector of claim 1 wherein said membrane is integral with a tee connection.

6. The tapping connector of claim 1 wherein said membrane is integral with a Y connection.

7. A method of connecting comprising the steps of:

a) providing a tapping connector comprising:

a connector body having a first end and a second end, the first and second ends defining a bore therebetween; and an arcuate membrane disposed within the bore between the first and second ends, the arcuate membrane isolating the first end from the second end; and b) connecting at least one of the first or second ends of the tapping connector to a first containment structure;

wherein the arcuate membrane comprises an elongated arch, the elongated arch being arched in a direction transverse relative to the bore, and the elongated arch being elongated in a longitudinal direction.

8. The method of claim 7, further comprising boring through the arcuate membrane to form a passageway connecting the bore of the tapping connector with the interior of the containment structure.

9. The method of claim 7, further comprising the step of connecting the other of the first or second ends of the tapping connector to a second containment structure.

10. The method of claim 7, further comprising the step of isolating the other of the first or second ends of the tapping connector with an isolation structure.

11. The method of claim 7 wherein the first containment structure is a carrier pipe.

12. The method of claim 9 wherein the first containment structure is a carrier pipe and the second containment structure is a branch pipe.

13. The method of claim 12, further comprising boring through the membrane to form a passageway connecting the bore of the tapping connector with the interiors of the first and second containment structures.

14. The method of claim 10 wherein the isolation structure comprises a blind flange on a gasket face flange side of the tapping connector.

15. The method of claim 14, further comprising the step of removing the blind flange to connect a second containment structure to the first containment structure via the tapping connector.

16. The method of claim 15 further comprising boring through the arcuate membrane to form a passageway connecting the bore of the tapping connector with the interiors of the first and second containment structures.

17. A tapping connector, comprising:

a connector body having a first end and a second end, the first and second ends defining a bore therebetween;

an arcuate membrane disposed within the bore between the first and second ends, and the arcuate membrane isolating the first end from the second end;

wherein the arcuate membrane comprises an elongated arch, the elongated arch being arched in a direction transverse relative to the bore, and the elongated arch being elongated in a longitudinal direction.

18. The tapping connector of claim 17, further comprising a weld neck disposed on the first end and a gasket face flange disposed on the second hand.

19. The tapping connector of claim 18, wherein the gasket face flange side defines a sealing groove facing outwardly from the bore.

20. A tapping connector, comprising:

a connector body having a first end and a second end, the first and second ends defining a bore therebetween; and an arcuate membrane disposed within the bore between the first and second ends, the arcuate membrane isolating the first end from the second end, and the arcuate membrane comprising an elongated arch arranged transverse relative to the bore; and a weld neck disposed on the first end and a gasket face flange disposed on the second end, the gasket face flange side defining a sealing groove facing outwardly from the bore;

wherein the arcuate membrane presents a concave profile oriented toward the weld neck side and a convex profile oriented toward the gasket face flange side.

21. A tapping connector, comprising:

a connector body having a first end and a second end, the first and second ends defining a bore therebetween; and an arcuate membrane disposed within the bore between the first and second ends, the arcuate membrane isolating the first end from the second end, and the arcuate membrane comprising a longitudinal segment of a conduit arranged transverse to the bore and intersecting inner surfaces of the connector.

* * * * *